United States Patent [19]

Hackman

[11] Patent Number: 4,713,539

[45] Date of Patent: Dec. 15, 1987

[54] PHOTOELECTRIC CONTROLLER DEVICE INCLUDING BRUSHES

[76] Inventor: Arthur F. Hackman, Box 12B, St. Jacob, Ill. 62281

[21] Appl. No.: 906,393

[22] Filed: Sep. 12, 1986

[51] Int. Cl.$^4$ .............................................. G01D 5/34
[52] U.S. Cl. ........................... 250/231 SE; 250/237 G
[58] Field of Search ..................... 250/231 SE, 237 G; 318/640, 554, 555

[56] References Cited

U.S. PATENT DOCUMENTS 3,831,169  8/1974  Raser .............................. 250/231 SE Primary Examiner—David C. Nelms
Assistant Examiner—Chung K. Seo
Attorney, Agent, or Firm—Haverstock, Garrett & Roberts

[57] ABSTRACT

A controller device for supplying power from a power source to a load including an assembly mounted for rotation, a motor for rotating the assembly, the assembly having relatively conductive and high resistance portions and an annular flange with an opening formed therethrough, a photocell or other position detector having a light producing portion located on one side of the flange and a light sensitive portion located on the opposite side thereof, a pair of spaced brushes positioned to make contact with the assembly during rotation thereof, at least one of the brushes periodically making contact with the high resistance portion thereof, a gated current conducting element having a gate electrode operatively connected to the light sensitive portion of the photocell to produce a conducting condition therein when light from the light producing portion of the photocell reaches the light sensitive portion thereof during rotation of the rotating assembly, circuitry including connections to the brushes and the current conducting element for causing current to flow through a load device in the circuit during operation of the controller device, and an operator member movable to change the position of the photocell or detector to change the times during each rotation of the rotating assembly when the opening in the flange moves between the light producing and light sensitive portions of the photocell. The controller device may have more than one photocell, more than one gated current conducting element and more than one high resistance portion on the rotating assembly.

25 Claims, 21 Drawing Figures

PHOTOELECTRIC CONTROLLER DEVICE INCLUDING BRUSHES

PRIOR ART

Numerous controller devices including electrical control devices have been invented and developed in the past including the control devices disclosed in U.S. Pat. Nos. 3,824,878; 4,182,953; 4,221,963; and 4,317,032. However, none of these devices discloses a controller device similar to the present controller device which is designed primarily as a current controller device for pulses of electrical energy.

BACKGROUND OF THE INVENTION

The present invention relates to a controller device with a rotatable assembly and means operatively connected to rotate the rotatable assembly, the rotatable assembly includes a member having an electrically conductive outer surface, a pair of axially spaced brushes mounted in slideable engagement with the electrically conductive outer surface on the electrically conductive outer surface of the rotatable assembly, a high impedance element mounted in the rotatable assembly in position to be in contact with one of the spaced brushes in a preselected position of rotation of the rotatable assembly to interrupt electrical communication between the spaced brushes, an annular flange having a notch or opening formed therein located on the rotatable assembly, a support member mounted on the rotatable assembly adjacent to one end thereof, a photocell device mounted on the support member in position to have a light emitting portion located on one side of the annular flange and a light sensitive portion located on the opposite side of the flange whereby light from the light emitting portion can reach the light sensitive portion only when the notch or opening in the flange is located therebetween, and an electrical circuit including a source of energy, an electronic switching device and a load device, the circuit having connections for connecting the photocell and the brushes so that current flows from the source of energy through the load device only after the electronic switching device is turned on by light from the light emitting portion of the photocell reaching the light sensitive portion thereof, current flowing from the energy source to and through the brushes and conductive portion of the rotatable assembly to the load being interrupted only when the high impedance element is in contact with the one brush. The subject controller device also includes apparatus operable to predeterminately change the location of the photocell to change the times during rotations of the rotatable assembly when the notch or opening in the flange is between the light emitting and light sensitive portions of the photocell.

The present controller device may include a plurality of similar tandem operated controller devices, it may be operated as a single phase controller device or a multiphase controller device, the rotatable assembly may have more than one high impedance element located at circumferentially spaced locations for contact by the one brush, and it may have more than one notch and/or more than one photocell device for cooperation with each other during rotation of the rotatable assembly.

It is a principal object of the present invention to teach the construction and operation of a novel highly versatile controller device for controlling the flow of current from a power source such as a battery or a rectified alternating current source through a load device.

Another object is to provide a relatively simple, compact controller device that can be constructed for use with single phase as well as multiple phase power systems.

Another object is to provide improved means for accurately and controllably distributing power to one or more loads.

Another object is to provide means for controlling the time duration of pulses of energy supplied from a power source to a load.

Another object is to provide a controller device that can be constructed to operate in tandem with and be driven by a common drive motor.

Another object is to provide a controller device that can be adjusted to produce repetitive pulses of energy of desired duration.

Another object is to provide operator controllable means to supply power to a load taking into account the needs at the time.

Another object is to control the operation of a photocell by microprocessor or other means in order to remotely control when a power pulse is initiated for motor control and other purposes.

Another object is to provide a controller device that is particularly well suited for operating a golf cart or like device.

Another object is to construct a controller device with means to circulate air therethrough to prevent overheating.

Another object is to provide a controller device that can, for the most part, be constructed using well known electrical components.

Another object is to provide a better way to distribute energy and particularly DC energy, to one or more load devices.

These and other objects and advantages of the present invention will become apparent to those skilled in the art after considering the following detailed specification of several preferred embodiments in conjunction with the accompanying drawings wherein:

DETAILED DESCRIPTION OF THE INVENTION

Figure 1:
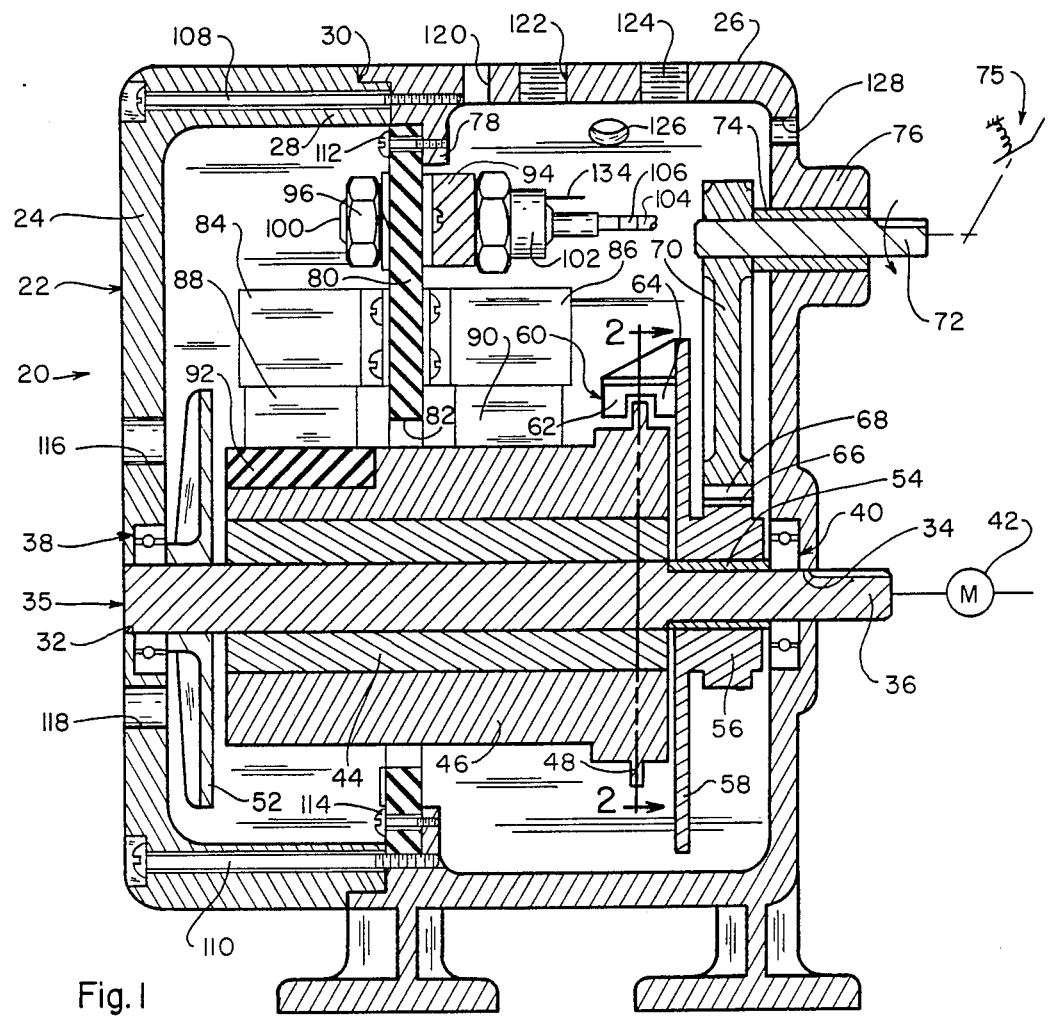
FIG. 1 is a cross-sectional view taken on the axis of a controller device constructed according to the teachings of the present invention.
Figure 2:
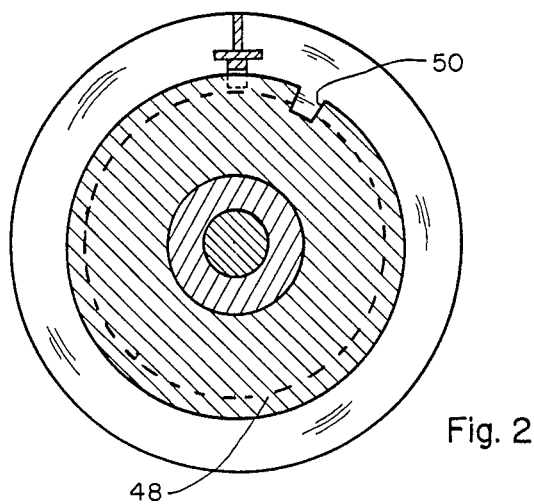
FIG. 2 is a fragmentary cross-sectional view taken on line 2—2 of FIG. 1.

Referring to the drawings more particularly by reference numbers, number 20 in FIG. 1 refers to a controller device constructed according to the teachings of the present invention. The controller device 20 can include a housing formed by two mating housing portions 24 and 26 which have respective overlapping flanges 28 and 30 which fit together as clearly shown. The housing portion 24 has a bore 32 therethrough which is aligned with bore 34 in the housing portion 26. A rotatable assembly 35 including shaft 36 is journalled in spaced bearing assemblies 38 and 40 to rotate in the aligned bores 32 and 34. The shaft 36 is shown rotated by a variable speed external drive motor 42 (FIG. 3) coupled thereto, and the shaft 36 has a tubular insulator member 44 mounted thereon and extending across the housing as shown. A tubular conductive member 46 is mounted on the insulator 44 and extends the length thereof. The conductive member 46 has an outwardly extending annular flange 48 adjacent one end, and the annular flange 48 has a notch or hole 50 (FIG. 2) formed therein.

The rotatable shaft 36 also carries a fan or blower member 52 shown adjacent one end thereof for circulating air in the housing 22, and the opposite end of the shaft 36 carries a tubular bushing 54 on which is located an adjustable member 56. The member 56 has an annular outwardly extending flange 58 which is located in the housing 22 adjacent to one end of the insulator member 44 and the conductive member 46. The flange 58 carries a photocell unit 60 which is constructed to have portions that straddle the flange 48 including a light emitting portion 62 located on one side of the flange 48 and a light sensitive portion 64 located on the opposite side of the flange 48. This means that when the assembly 35 including the members 44 and 46 thereof is rotated, the annular flange 48 will rotate between the light emitting source 62 and the light sensitive member 64 and these members will be in optical communication with each other only when the notch 50 moves therebetween. This is important to the operation as will be explained.

The member 56 has gear teeth 66 formed on its outer periphery and these mesh with gear teeth 68 formed on sector gear 70 which in turn is mounted on a shaft 72. The shaft 72 is mounted for limited rotation in tubular sleeve or bushing 74 located in a projecting boss 76 in the housing member 26. The free or outer end of the shaft 72 may have a foot pedal, a stepper motor, a handle or a crank 75, and may be spring biased into a certain position or it may have a screwdriver slot or a hexagonal head portion which is provided for rotating the shaft 72 and the sector gear 70 for control and adjustment purposes. When the shaft 72 is rotated it will rotate the sector gear 70, and in so doing the gear teeth 68 will cause the gear teeth 66 on the member 56 to move. This in turn will cause the photocell 60 to be relocated circumferentially relative to the annular flange 48 and particularly relative to the notch 50 therein to change the pulse duration or position where the notch 50 moves between the portions 62 and 64 of the photocell 60. The shaft 72 and the sector gear 70 are therefore the means provided to control the pulse duration, and hence the output, of the subject device as will be more fully explained.

The right-hand housing member 26 has an inwardly extending flange 78 to which is attached an insulator member 80 which has an opening 82 therethrough that is large enough to receive the rotatable assembly 35. The insulator member 80 has brush support members 84 and 86 attached to opposite sides thereof which support brushes 88 and 90 respectively. The brushes 88 and 90 make sliding contact with the outer surface of the tubular conductor member 46 and with a high resistance or high impedance element 92 located therein as shown in FIG. 1. The high impedance element 92 is positioned to be intermittently slideably engageable only by the brush 88 during rotation of the member 46. The high impedance element 92 is provided for breaking an electric circuit through the brush 88 as will become apparent in the discussion of the circuit for the subject device, and also serves to minimize arcing.

Also mounted on the insulator wall 80 is a heat sink 94 which is held in place by nut 96. The heat sink 94 is included as part of an electronic switching device 102 shown as being a silicon controlled rectifier (SCR). The SCR 102 has anode and cathode leads 104 and 106 connected thereto.

FIG. 1 also shows threaded members 108 and 110 for connecting the housing members 24 and 26 together, and other threaded members 112 and 114 are provided for attaching the insulator wall 80 to the housing flange 78. The housing may also include openings such as the openings 116, 118, 120, 122, 124, 126 and 128 for enabling air circulation through the housing and for accommodating electrical leads for the various elements including for the SCR 102, for the photocell 60 and for the brushes 88 and 90.

Figure 3:
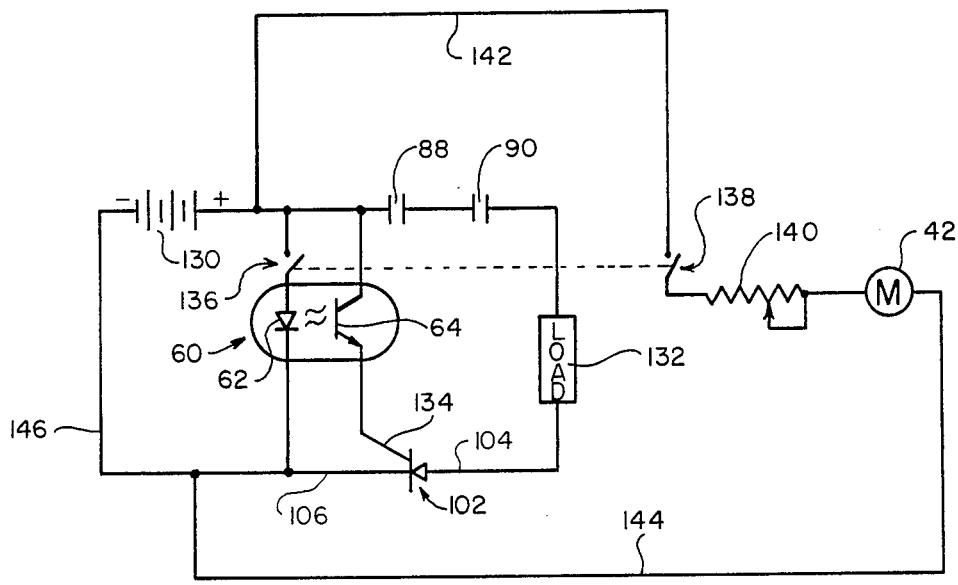
FIG. 3 is a schematic circuit diagram for the controller device of FIG. 1.

FIG. 3 is a circuit diagram for the controller device 20 shown in FIG. 1. The circuit includes a battery 130 or other DC or rectified AC source, the photocell 60 including the light emitting portion 62 and the light sensitive portion 64, the brushes 88 and 90, a load device 132, the electronic switching device or SCR 102 including its gate electrode 134, a pair of ganged switches 136 and 138 connected as shown, a variable resistance or potentiometer 140 or other means of speed control of the vaiable speed motor 42, and the circuit leads including leads 104, 106, 142, 144 and 146. The other circuit connections shown in FIG. 3 are not identified by numbers.

When the brushes 88 and 90 are both in contact with the tubular conductor 46 and the sequenced, ganged switches 136 and 138 are in their closed conditions, the battery 130 is in an electrical circuit which includes the lead 142, the closed switch 138, the potentiometer 140, the drive motor 42, and the leads 144 and 146. This circuit energizes the drive motor 42 which operates to rotate the rotatable assembly 35 formed by the shaft 36, the tubular insulator 44 and the tubular conductor member 46. As the assembly 35 rotates the brushes 88 and 90 continue to make contact with the conductive member 46 to complete a circuit through the brushes 88 and 90, and through the load 132 to one side of the SCR 102. The opposite or cathode side of the SCR 102 is connected back to the battery 130 by way of the leads 106 and 146. No current will be able to flow through this circuit until the SCR 102 is gated or turned on. At the same time a circuit is also established through the light emitting portion 62 of the photocell 60 by way of the now closed switch 136 and the lead 146. However, no light from the light emitting portion 62 will reach the light sensitive portion 64 until the notch 50 in the flange 48 moves between the portions 62 and 64. When this occurs a circuit will be established from the battery 130 through the light sensitive portion 64 which is now conducting to the gate electrode 134 of the SCR 102. This will cause the SCR 102 to go to its conducting condition, and the SCR will remain turned on and conducting until the brush 88 encounters the high impedance element 92 located in the tubular conductive member 46 as aforesaid. The provision of the high impedance element 92 is the preferred use of an insulating element because the impedance element 92 is better able to dissipate heat than an insulating element. When the brush 88 encounters the high impedance element, the current flow through the SCR 102 will be reduced, forcing the SCR to stop conduction. Hence, the turning on of the SCR 102 will operate to enable the feeding of current from the battery 130 through the load 132 and through the SCR 102, and this condition will remain until interrupted by the brush 88 coming in contact with the high impedance element 92. The duration of each pulse of power to the load will therefore be from the time the SCR 102 is gated until current flow is cut off by the brush 88 coming in contact with the high impedance element 92. The duration of each pulse of power to the load can be varied by varying the position of the photocell 60. This can be accomplished by connecting the foot pedal 75 or other operator member to the shaft 72. The pedal or lever 75 can be spring biased and can be attached to a device to be powered such as to a golf cart, electric lift truck or other motor driven device. In this way the amount of power to the load can be metered as needed which is not possible with known controls for the same or similar purposes. Furthermore, if a motor is the load to be powered, the speed of the load motor can be controlled by using the pedal 75 to vary the duration of each pulse of power to the load.

Figure 4:
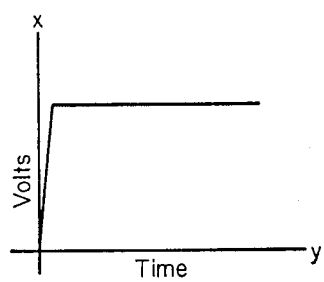
FIG. 4 is a graph of DC output voltage from the controller of FIG. 1 plotted against time.
Figure 5:
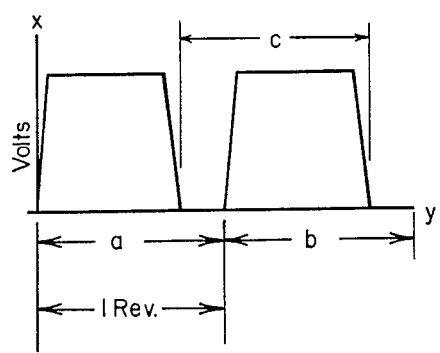
FIG. 5 is a graph similar to FIG. 4 but for output power from the subject controller during two successive rotations thereof.

FIG. 4 illustrates the condition wherein the SCR 102 is turned on at or near the beginning of each revolution of the assembly 35 or at 0°. FIG. 5 illustrates the conditions that exist during two succeeding rotations of the rotatable assembly 35 wherein the SCR 102 is turned on by the notch 50 moving between the portions 62 and 64 of the photocell 60 at or near 0°, and where the brush 88 encounters the high impedance element 92 at some point just ahead of the end of each rotational period of the assembly 35. Since the drive motor 42 is energized at all times when the switches 136 and 138 are closed the member 46 will continue to rotate indefinitely until the switches are opened. It is possible, however, by moving the position of the sector member 70 using the pedal 75 or other means to move the member 72 to relocate the position of the photocell 60 relative to the annular flange 48 in order to change the time at which the SCR 102 is turned on during each rotation of the assembly 35 and therefore to vary the amount of power fed to the load 132 by changing the duration of the timed pulses. Note that movements of the sector member 70 do not effect the position or operation of the high resistance member 92 relative to the brush 88 but do change the duration of the power pulses that are produced. Thus moving the sector member 70 provides means for changing the time duration of the power pulses that are produced and therefore the amount of output energy available for work.

Figure 6:
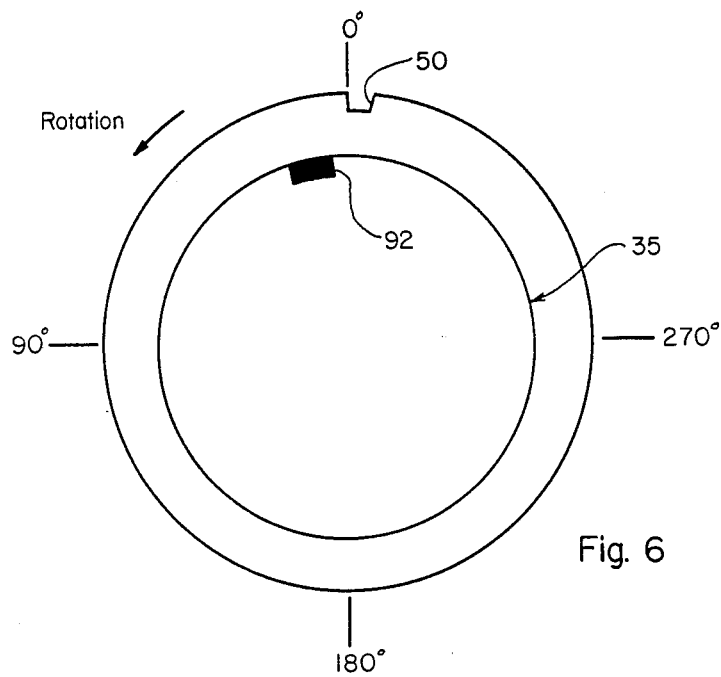
FIG. 6 is a left end view of the rotatable assembly omitting the air circulator employed in the subject controller device shown rotating counterclockwise.
Figure 7:
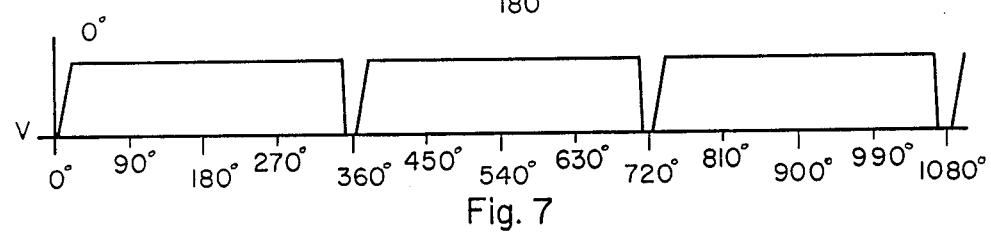
FIG. 7 is a graph of output power during succeeding cycles of rotation of the rotatable assembly when the photocell is located to be triggered at or shortly after 0°.

FIG. 6 shows the notch or hole 50 located at or near zero degrees (0°) with the high resistance element located just ahead of 0°. Rotation of the assembly 35 is in the counterclockwise direction as shown. Operation of the circuit for these conditions can be illustrated in FIG. 7 where it is seen that the SCR 102 is turns on shortly after 0° and is not turned off until the assembly 35 has rotated nearly a full 360°. In this condition, near maximum power will be supplied to the load.

Figure 8:
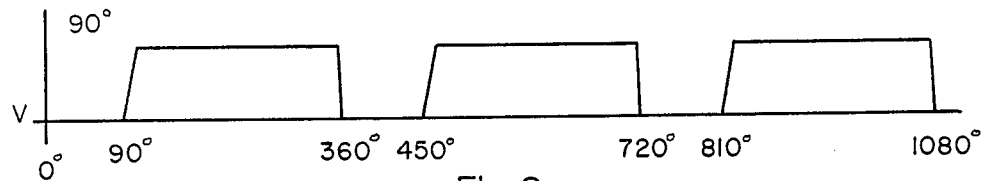
FIG. 8 is a graph similar to FIG. 7 but for the condition where the position of the photocell has been advanced to be triggered by the notch 50 after about 90° of rotation.
Figure 9:
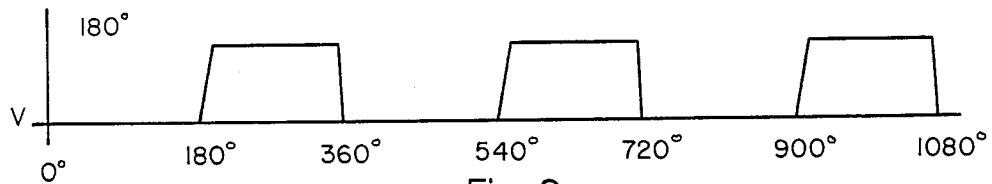
FIG. 9 is a graph similar to the graph of FIG. 7 but where the position of the photocell has been advanced to be triggered by the notch 50 after about 180° of rotation.
Figure 10:
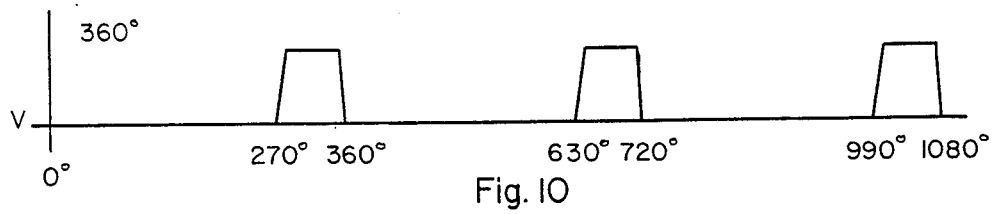
FIG. 10 is a graph similar to the graph of FIG. 7 but where the position of the photocell has been advanced to be triggered after about 270° of rotation.

FIGS. 8, 9, and 10 show the outputs produced for different positions of the sector gear 70 and notch or hole 50 provided by repositioning the sector gear 70 using the pedal 75 or other means. FIG. 8 illustrates the condition where the sector gear 70 has moved the photocell 60 so that the power is turned on at about 90° into each cycle and is turned off at or near the end of each rotation of the assembly 35. For this condition of the sector gear 70 energy is fed to the load during approximately three quarters of each cycle of rotation.

FIG. 9 illustrates the condition where the photocell 60 has been retarded by about 180° so that power is only supplied to the load during approximately one half of each cycle of rotation of the rotatable assembly 35, and FIG. 10 illustrates the situation where the photocell 60 has been further retarded so that the SCR is turned on after about three quarters of each cycle of rotation and energy is supplied to the load during only approximately one fourth of the total time.

Figure 11:
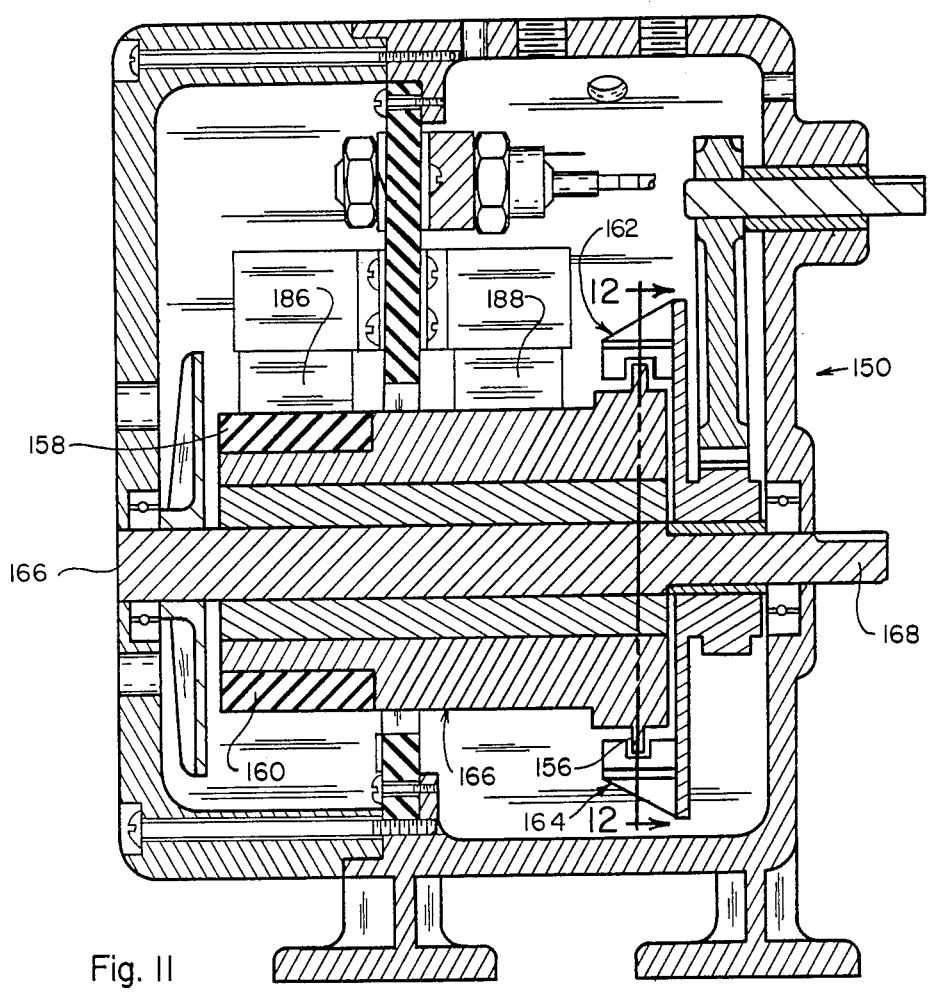
FIG. 11 is a cross-sectional view similar to FIG. 1 but showing a modified embodiment of the subject controller device.
Figure 12:
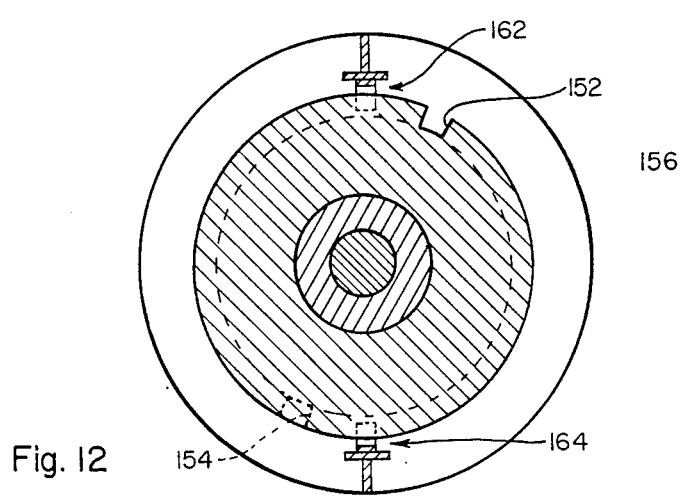
FIG. 12 is a fragmentary cross-sectional view taken on line 12—12 of FIG. 11.
Figure 13:
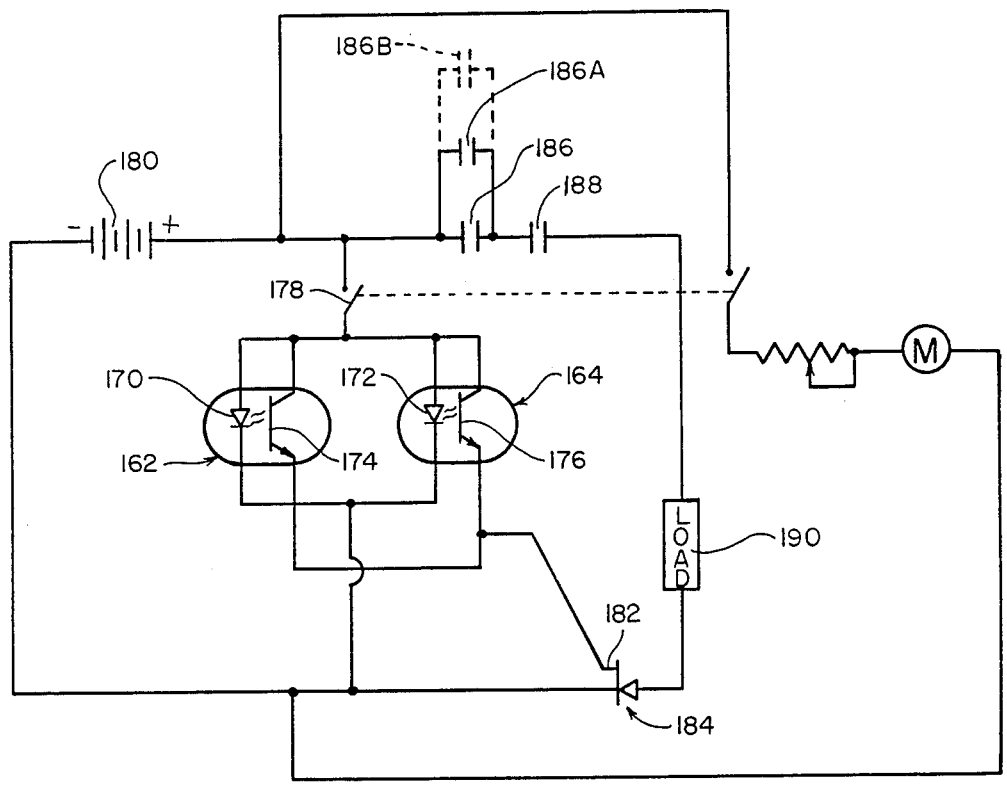
FIG. 13 is a schematic diagram of the circuit for the modified embodiment of the subject controller shown in FIG. 11.
Figure 14:
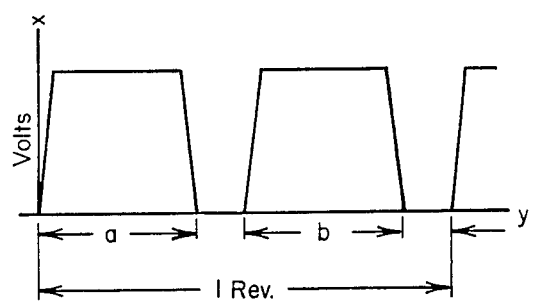
FIG. 14 is a graph of DC output plotted as a function of time for one revolution of the rotatable assembly in the modified controller of FIG. 11.

FIGS. 11, 12, and 13 illustrate another embodiment 150 of the subject controller device which has many of the same structural characteristics as the device 20 shown in FIG. 1. The main differences between the embodiment 150 and the embodiment 20 reside in the provision of having two spaced high impedance members 158 and 160 instead of one, and two spaced photocells 162 and 164 also instead of one. An optional second notch or hole can also be provided for some applications such as higher frequency outputs. The notches are shown as notches 152 and 154 in FIG. 12.

In the circuit for the construction 150 shown in FIG. 13 the two photocells 162 and 164 are shown connected in parallel for reasons which will be described hereinafter. The basic structural and operational features of the embodiment 150 are similar to those of the embodiment 20 including the fact that the rotatable assembly 166 is coupled through shaft 168 to an external drive motor M.

Referring to FIG. 13 it is seen that the circuit for the device 150 corresponds in many respects to the circuit shown in FIG. 3 but also differs therefrom including in that the light emitting portions 170 and 172 and the light sensitive portions 174 and 176, of the respective photocells 162 and 164, are all connected in parallel, as aforesaid. The light emitting portions 170 and 172 are connected in parallel, in series with switch 178 and directly across battery 180, and the light sensitive portions 174 and 176 are connected in parallel between the positive side of the battery 180 through the switch 178 to the gate electrode 182 of common SCR 184. Therefore, when light from either of the light emitting portions 170 or 172 is able to reach the respective light sensitive portion 174 or 176, a condition will be established to gate the SCR 184 to enable current to flow from the battery 180 through brushes 186 and 188 to and through the load 190. The fact that the SCR 184 can be gated by more than one different photocell is one feature that distinguishes the construction 150 from the construction 20. The construction 150 is also shown provided with one or more brushes 186A and 186B in parallel with the brush 186 to provide alternate power flow paths to the load. This is an optional feature which may or may not be used. It is important to note that additional photocells connected in parallel with the photocells 162 and 164, in series with the switch 178 and battery 180 and appropriately spaced notches such as notches 152 and 154 can be added to further increase electrical output pulses for the same rotational frequency of the rotatable assembly 166.

Figure 15:
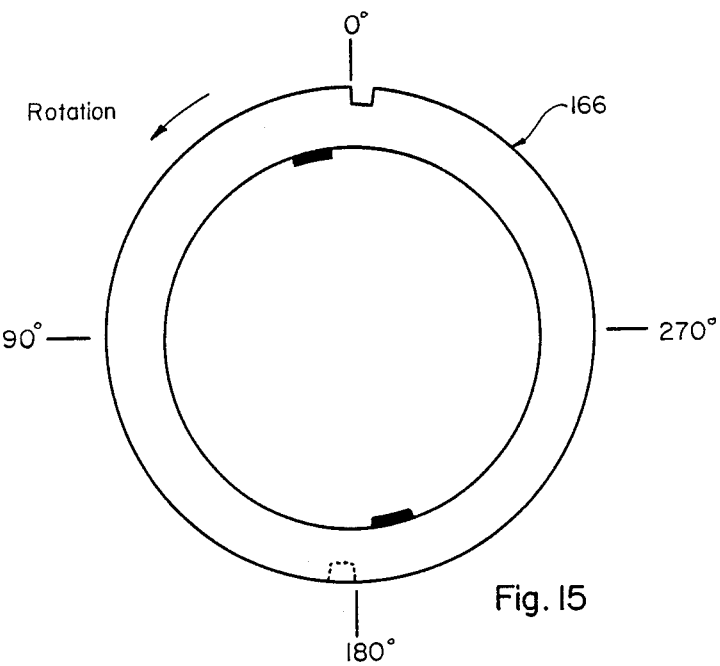
FIG. 15 is a left end view similar to FIG. 6 of the rotatable assembly omitting the air circulator employed in the controller of FIG. 11.

FIG. 15 shows the relative locations of the photocells 162 and 164 and the high impedance members 158 and 160 on the rotatable assembly 166 for the controller 150 with a single notch 152 in the flange 156. Only one notch 152 is needed in the construction of FIG. 11 to produce two energy pulses during each revolution of the assembly 166. However, additional notches such as the notch 154 could be provided to increase the number of circuit possibilities. In the circuit as shown in FIG. 13, there is therefore the possibility to produce more frequent energy pulses than for the circuit of FIG. 3. The duration of the individual pulses can be varied as desired by controlling the sector gear such as sector gear 70 in the manner indicated.

Figure 16:
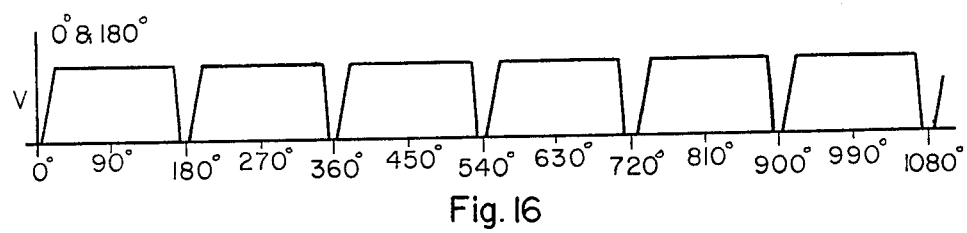
FIGS. 16-19 are graphs of output similar to the graphs of FIGS. 7-10 for the controller of FIG. 11.
Figure 17:
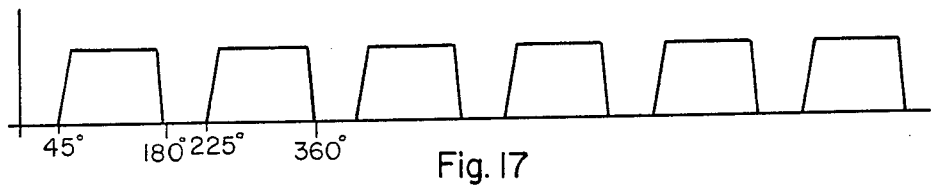
Figure 18:
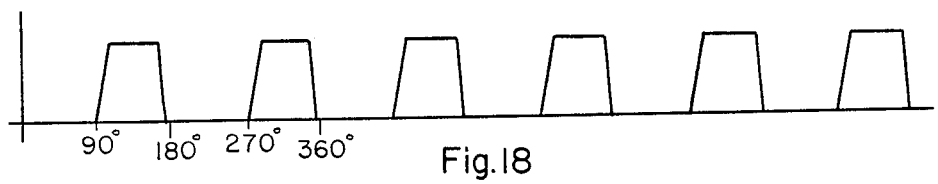
Figure 19:
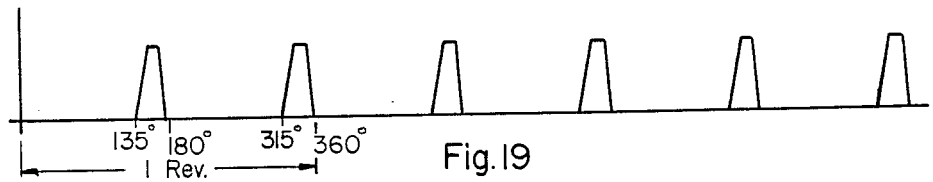

FIGS. 16-19 show the output pulse forms for different positions of the sector gear 70 going from the condition shown in FIG. 16 where there is near maximum output to FIG. 19 where there is near minimum output. FIGS. 17 and 18 show the output waveforms when the output pulse occurs during approximately one quarter and one half respectively of each half cycle of rotation of the assembly 166. The construction 150 is similar and operates similarly to the construction shown in FIG. 1.

It is also possible, as aforesaid, to increase the number of notches 50, 152, and 154 in the rotatable flanges 48 and 156 and increase the number and location of the photocells and high resistance portions to produce still other operating characteristics. The important thing is that the present construction lends itself to a wide range of power outputs which can be smoothly applied by operation of a foot pedal or other operator including also a microprocessor controlled stepper motor, any one of which will change the position of the photocells and therefore changes the time duration of the output pulses. No known device has the same characteristics.

Figure 20:
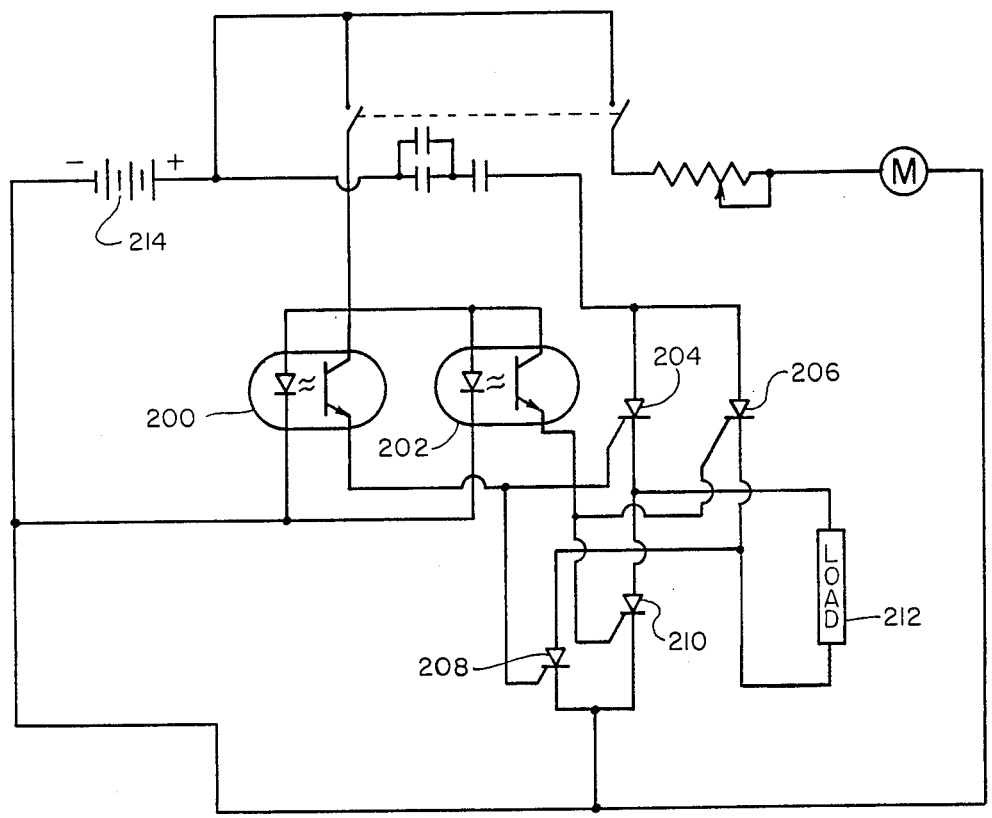
FIG. 20 is a schematic circuit diagram for still another embodiment of the subject controller; and, FIG. 21 is a graph of output for a controller device employed with the circuit shown in FIG. 20.
Figure 21:
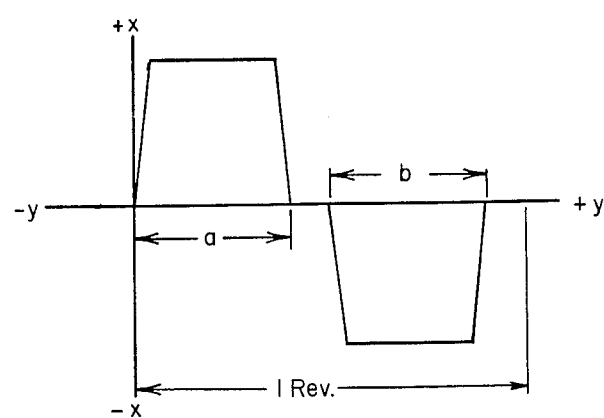

FIG. 20 shows the circuit for another embodiment of the subject device, which embodiment has the same basic construction but includes two photocells 200 and 202 and four SCRs 204, 206, 208, and 210. In this construction the photocell 200 controls the gating of the SCRs 204 and 208 and the photocell 202 controls the gating of the SCRs 206 and 210. The cathode of the SCR 204 and the anode of SCR 210 are connected to one side of load 212 and the cathode of SCR 206 and the anode of SCR 208 are connected to the opposite side of the load 212. Additionally, the SCR 204 is also connected in series through the load 212 and the SCR 208 across the battery 214 during one half cycle of conduction. During the other half cycle of conduction, the SCR 206 is in series through the load 212 with the SCR 210 and the battery. It is therefore possible with the circuit shown in FIG. 20 using appropriately positioned notches in the flange on the rotatable assembly, and with a proper number of high resistance elements to control the turning on and turning off of the current flow through the load and to produce alternating current to the load.

The battery may be replaced by a source of rectified filtered AC and be controlled by the device to control AC machinery and motors as well as DC machinery and motors. It should now be apparent that it is possible to have many different variations and uses for the subject controller device, and the subject device has uses and applications in many different environments. Units can also be tandem mounted to increase capacity. Obviously, additional rotatable elements can be tandem mounted to provide three phase or any number of additional phases. For example, the present device can be used to control the power flow to a motor such as a drive motor of a golf cart or like device, to provide smooth increases and decreases in power to any other drive motor and over the full range of operating conditions including from no load to full load and to provide a distribution of electrical power to electric engines. The subject device can also be used in many other environments including in any environment where it is desired to provide accurate control over the amount of power that is fed to a load for any purpose. Still further, the present device can be used to apply AC or DC power from a source to a load and in a manner whereby the application of power to the load can be precisely controlled and monitored to provide smooth control and acceleration of the motor including during starting conditions and the like not heretofore available by any known device. The present device therefore represents an important and substantial improvement over known devices.

The present controller device is therefore capable of the smooth transfer of power from an energy source to a load over a wide range and it can supply power over a wide range of frequencies and pulse durations. There are many applications for the subject controller including applications where energy is required for widely varying loads on an as needed basis. Golf carts are a good example of such needs because they are easy to visualize but clearly they represent only one of many possible applications. In the golf cart situation, there may be a requirement for power over a broad range depending on the number of riders, the weight of their clubs, and the size and orientation of the cart. With a cart equipped with the subject controller, the driver can demand full load for starting even on an uphill grade and can reduce the load as the attitude of the cart changes based on need. Other uses for the subject device include use on all types of electric vehicles, to control electric motors or banks of motors, and for use on equipment that must be started and stopped or reversed.

Thus there has been shown and described a novel control device which fulfulls all of the objects and advantages sought therefor. Many changes, modifications, variations and other uses and applications for the subject controller device will become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. A controller device including a rotatable assembly and a drive motor operatively connected to rotate the rotatable assembly, the rotatable assembly includes a member having an outer surface formed by conductive and relatively high resistance portions, a pair of spaced brushes in slidable contact with the outer surface, one of said brushes contacting the conductive portion only and the other contacting the conductive and high resistance portions during rotation of the assembly, an annular flange having an opening formed therein on the rotatable assembly, a photocell having a light emitting portion located on one side of the annular flange and a light sensitive portion located on the opposite side of the annular flange whereby light from the light emitting portion can reach the light sensitive portion only at times when the opening is located therebetween, a circuit for the controller device including a source of energy, an electronic switching device having input, output, and gate electrodes, a load device and circuit connections therebetween, the photocell and the brushes having circuit connections such that current flows from the energy source through the load device whenever the switching device is turned on by light from the light emitting portion of the photocell reaching the light sensitive portion thereof, said light sensitive portion having a circuit connection to the energy source and to the gate electrode of the switching device, current flowing through and between the brushes to the load whenever the switching device is turned on and as long as the brushes of said pair are both in contact with the conductive portion of the assembly.

2. The controller device of claim 1 including actuator means operatively connected to the photocell and movable to change the position of the photocell relative to the rotatable assembly.

3. The controller device of claim 2 wherein the actuator means includes a spring biased pedal member and cooperative gear members, one of which is operatively connected to the pedal member and another to the photocell.

4. The controller device of claim 1 wherein the rotatable assembly includes a shaft and a housing through which the shaft extends, a drive motor operatively connected to the shaft externally of the housing for rotating the assembly, insulating means mounted on the shaft in the housing, the said conductive portion being mounted on the insulating means.

5. The controller device of claim 1 including means on the rotatable assembly for circulating air.

6. The controller device of claim 1 wherein the switching device is a silicon controlled rectifier device.

7. The controller device of claim 4 wherein the housing has a wall member located therein at an intermediate location along the rotatable assembly, said wall member having an opening for receiving the rotatable assembly therethrough and including means thereon for mounting the pair of brushes and the switching device.

8. The controller device of claim 1 wherein the rotatable assembly has a pair of circumferentially spaced high resistance elements thereon.

9. The controller device of claim 8 including a pair of photocells located at spaced locations circumferentially relative to the annular flange.

10. The controller device of claim 1 including switch means in the circuit, said switch means having an open inoperative position and a closed position, the closed position of the switch means establishing a circuit portion for energizing the drive motor and another circuit portion for energizing the light emitting portion of the photocell.

11. The controller device of claim 1 including a microprocessor and means operatively connecting the photocell to the microprocessor.

12. A controller device for supplying power from a power source to a load comprising a housing having spaced side walls with aligned openings therethrough, a rotatable assembly having a shaft portion journaled in the spaced housing openings, said assembly having an annular outer surface formed by relatively conductive and high resistance surface portions and an annular outwardly extending flange mounted thereon, said flange having an opening formed therein, a photocell formed by spaced light producing and light sensitive portions positioned in the housing in position having the light emitting and light sensing portions thereof located on opposite sides of the annular flange, means connected to the shaft of the rotatable assembly for rotating said assembly in the housing whereby the annular flange moves between the light producing and light sensitive portions of the photocell to block light passage therebetween except when the opening is therebetween, a pair of spaced brushes mounted in the housing in position to contact the outer surface of the rotatable assembly during rotation thereof, one of said brushes periodically making contact with the relatively high resistance portion of the rotatable assembly to interrupt current flow between the spaced brushes, a current conducting element having first and second main electrodes and a gate electrode for controlling current conduction between the first and second main electrodes, circuit means for connecting the power source to the gate electrode through the light sensitive portion of the photocell whereby when said opening moves between the light producing and light sensitive portions of the photocell the current conducting element is changed from a relatively non-conducting to a relatively conducting condition, other circuit means including a load element connected in circuit with the brushes and with the first and second main electrodes of the current conducting element to produce current flow through the load element whenever the current conducting element is in a conducting condition and the first and second brushes are simultaneously making contact with the electrically conducting portion of the rotatable assembly, and actuatable means having a portion mounted in the housing and operatively connected to the photocell and a portion movable to change the position of the photocell in the housing and hence to change the time during rotation of the rotatable assembly when the opening moves between the light producing and light sensitive portions of the photocell.

13. The controller device of claim 12 including a pair of circumferentially spaced photocells in the housing each having a light producing and a light sensitive portion, actuation of the actuatable means producing similar relative movements of both of the photocells in the housing.

14. The controller device of claim 12 wherein the power source includes a battery.

15. The controller device of claim 12 wherein the power source is a DC source.

16. The controller device of claim 12 wherein the rotatable assembly has two circumferentially spaced relatively high resistance portions formed thereon.

17. The controller device of claim 12 wherein the current conducting element is a silicon controlled rectifier.

18. The controller device of claim 12 wherein the power source is a rectified AC source.

19. The controller device of claim 12 including a microprocessor in association with the photocell to provide a microprocessor controllable motor.

20. The controller device of claim 12 wherein the housing has spaced openings formed therein and the rotatable assembly has means attached thereto for circulating air in the housing and through the housing openings.

21. The controller device of claim 12 wherein the actuatable means includes a sector gear rotatably supported in the housing and the photocell is located in the housing on gear means positioned on the shaft portion of the rotatable assembly, said gear means being engageable with the sector gear.

22. The controller device of claim 12 including motor means operatively connected to rotate the rotatable assembly, and circuit means connecting the power source across the motor means for energizing same.

23. The controller device of claim 12 including means for adjusting the speed of rotation of the motor means.

24. The controller device of claim 12 including a pair of circumferentially spaced photocells, each having a light producing and a light sensitive portion, and a plurality of silicon controlled rectifiers connected into a circuit to conduct current of opposite polarities through the load, two of said silicon controlled rectifiers having gate electrodes connected to the light sensitive portion of one of said photocells, the other of said silicon controlled rectifiers having gate electrodes connected to the light sensitive portion of the other of said pair of photocells.

25. The controller device of claim 12 wherein one of said pair of spaced brushes includes two brushes connected in parallel.

* * * * *